United States Patent [19]

Sato

[11] Patent Number: 4,991,034

[45] Date of Patent: Feb. 5, 1991

[54] DC RESTORATION CIRCUIT FOR RESTORING AND COMPENSATING A LOW FREQUENCY COMPONENT LOST IN A DIGITAL SIGNAL

[75] Inventor: Kenichi Sato, Ougaki, Japan

[73] Assignee: Sanyo Electric Co., Ltd., Moriguchi, Japan

[21] Appl. No.: 281,731

[22] Filed: Dec. 9, 1988

[30] Foreign Application Priority Data

Dec. 11, 1987 [JP] Japan .................... 62-314977
Dec. 14, 1987 [JP] Japan .................... 62-315753
Dec. 14, 1987 [JP] Japan .................... 62-315754

[51] Int. Cl.⁵ .................... G11B 5/02; G11B 5/00; G11B 5/09
[52] U.S. Cl. .................... 360/67; 360/32
[58] Field of Search .................... 360/32, 10.3, 46, 64, 360/66, 65, 67; 307/359; 375/76; 358/171, 327, 328; 330/291, 294; 329/325

[56] References Cited

U.S. PATENT DOCUMENTS 3,264,569 4/1966 Lefferts .................... 330/291
4,692,914 9/1987 Yasumura et al. .................... 360/64

FOREIGN PATENT DOCUMENTS 60-129975 7/1985 Japan .
61-123064 6/1986 Japan .
62-16275 1/1987 Japan .

Primary Examiner—Aristotelis M. Psitos
Assistant Examiner—Varsha V. Sheladia
Attorney, Agent, or Firm—Armstrong, Nikaido, Marmelstein, Kubovcik & Murray

[57] ABSTRACT

A direct current restoration circuit in a digital VTR restores a low frequency component as a cut off in an input digital signal. The direct current restoration circuit has a feedback loop having variable gain. This gain is controlled according to a level of the signal obtained by adding an input signal and a signal as feed back. Therefore, the gain of the feedback loop can be precisely controlled irrespectively of wandering of the base line of the input signal. In addition, the feedback loop is cut off over a predetermined period including the time of switching of a magnetic head, so that waveform distortion at the time of switching can be prevented from being enlarged by the direct current restoration circuit. Additionally, the gain of the feedback loop is changed according to switching of the magnetic head, so that the low frequency component can be suitably compensated for each respective reproducing channel.

25 Claims, 12 Drawing Sheets

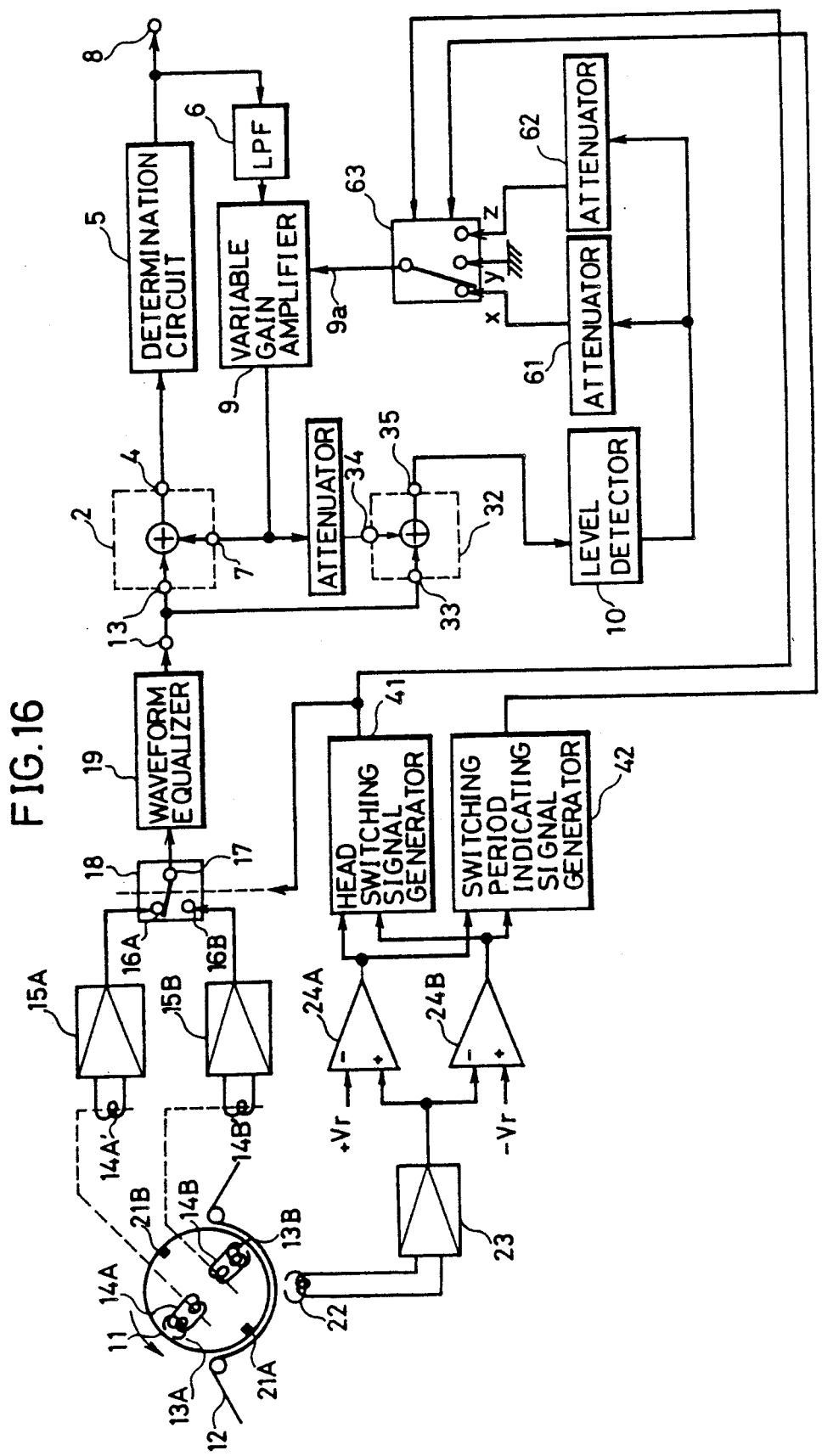

(a)

(b)

(a)

(b)

DC RESTORATION CIRCUIT FOR RESTORING AND COMPENSATING A LOW FREQUENCY COMPONENT LOST IN A DIGITAL SIGNAL

BACKGROUND OF THE INVENTION

1. Field of the Invention

The present invention relates generally to a DC (direct current) restoration circuit, and more particularly, to a DC restoration circuit for restoring and compensating a low frequency component of a digital signal if the low frequency component is lost in a digital signal transmission, recording or reproducing system such as a digital video tape recorder (referred to as digital VTR hereinafter).

2. Description of the Background Art

Conventionally, a digital signal such as a non-return-to-zero (referred to as NRZ hereinafter) signal comprises a low frequency region including a DC component. FIG. 1 is a diagram showing frequency characteristics of such a digital signal, where the abscissa represents a relative frequency and the ordinate represents a relative level. In FIG. 1, a solid line represents frequency characteristics of the above described digital signal comprising low frequency component. In transmitting the digital signal, a signal component in the low frequency region, which is represented by a broken line may be cut off.

More specifically, for signal transmission through, for example, a transmission path, the transmission of a digital signal and the supply of power may be simultaneously made using a pair of signal lines. In such a case, a low frequency component in the digital signal may be cut off to transmit only a signal having a frequency component which is higher than a given value, and a low frequency region including a DC region may be allocated to the supply of power.

Additionally, for recording and reproducing of the digital signal in, for example, a digital VTR, the low frequency component in the digital signal is lost due to differential response characteristics of a magnetic head.

As described in the foregoing, when the low frequency component in the digital signal is cut off, the base line of the digital signal wanders. FIG. 2 is a waveform diagram showing the digital signal having its base line wandering, where a solid line represents a waveform of the digital signal and a dot and dash line represents the base line thereof. If and when the base line wanders as shown in FIG. 2, it becomes difficult to precisely determine whether the digital signal is at a high level or a low level on a receiving or reproducing side of the digital signal. As a result, there is an increased possibility that a code error occurs.

Therefore, conventionally, on the receiving or reproducing side of the digital signal, a DC restoration circuit, using a so-called quantized feedback method, is utilized in order to compensate for the low frequency component which is lost in the digital signal. Such a DC restoration circuit is disclosed in, for example, Japanese Patent Laying-Open Gazette No. 129975/1985.

FIG. 3 is a schematic block diagram showing one example of such a conventional DC restoration circuit, and FIG. 4 is a diagram showing frequency characteristics of the circuit shown in FIG. 3. In FIG. 4, the abscissa represents a relative frequency and the ordinate represents a relative level, as in FIG. 1.

In FIG. 3, a digital signal having a frequency component represented by a solid line in FIG. 4 is input to an input terminal 1 from a predetermined transmission or reproducing system. This digital signal corresponds to a signal having its low frequency region represented by the broken line in FIG. 1 out of the inherent frequency component represented by the solid line shown in FIG. 1 cut off by the above described various causes. This digital signal is applied to one input terminal 3 of an adder 2. In addition, an output terminal 4 of the adder 2 is connected to an input of a determination circuit 5. This determination circuit 5 performs processing such as retiming and data regeneration with respect to an input signal. A data signal "1" or "0" is outputted from an output terminal 8. A low frequency component extracted by a low-pass filter (LPF) 6 in this data signal is applied to another input terminal 7 of the adder 2 as a feedback signal. It is assumed that pass characteristics of the LPF 6 are set to be approximately equal to low frequency cut-off characteristics of the digital signal applied to the input terminal 1. As a result, a low frequency component as represented by a broken line in FIG. 4 is extracted from the LPF 6 and added to the input signal by the adder 2, so that the lost low frequency component in the input digital signal is restored.

Meanwhile, in the conventional DC restoration circuit as shown in FIG. 3, the feedback value from the LPF 6 is always constant. Thus, in the case of recording and reproducing of the digital signal in, for example, the digital VTR, if the amplitude of the input digital signal is wanders due to spacing loss, drop out or the like, a balance between a compensation signal from the LPF 6 and a signal to be compensated for from the input terminal 1 is destroyed because the feedback value is constant as described above, so that stable compensation for a low frequency component can not be made.

FIG. 5 is a diagram showing one example of a DC restoration circuit proposed to solve such a problem, which is disclosed in, for example, Japanese Patent Laying-Open Gazette No. 123064/1986. The DC restoration circuit shown in FIG. 5 is the same as the DC restoration circuit shown in FIG. 3 except for the following. More specifically, a variable gain amplifier 9 is provided between an LPF 6 and an input terminal 7 of an adder 2. In addition, there is provided a level detector 10 for detecting a level of a signal input to an input terminal 1. More specifically, this level detector 10 has a function of rectifying and further smoothing the input signal. The gain of the variable gain amplifier 9, i.e., the feedback value from the LPF 6 is controlled by a control signal from the level detector 10. More specifically, in the DC restoration circuit shown in FIG. 5, the feedback value is controlled according to the level of the input digital signal, so that stable compensation for a low frequency component can be made.

However, the level detector 10 in the DC restoration circuit shown in FIG. 5 also detects a level of a low frequency component including a DC component, in the input digital signal. Thus, considering a case in which the base line of the input digital signal wanders by an extremely large amount, even if the amplitude itself of the input digital signal does not significantly wander, the wandering of the base line appears at an output of the level detector 10.

FIGS. 6(a) and (b) are waveform diagrams for explaining the principle on which such a phenomenon occurs. More specifically, when a digital signal (represented by a solid line) having a base line (represented by a dot and dash line) which greatly wanders, as shown in FIG. 6(a), is input to the level detector 10, this signal is rectified with respect to a reference level represented by an arrow A in the figure, as represented by a solid line in FIG. 6(b) and then, smoothed. As a result, an output as represented by a broken line in FIG. 6(b) is obtained from the level detector 10. Thus, even if the amplitude of the input digital signal (solid line) itself is approximately constant as shown in FIG. 6(a), the output of the level detector 10 (represented by a broken line in FIG. 6(b)) wanders due to the wandering of the base line (dot and dash line). As a result, the gain of the variable gain amplifier 9 is changed. More specifically, the feedback value from the LPF 6 wanders almost independently of the level of the input signal itself due to the wandering of the base line of the input signal, so that a balance between a compensation signal from the LPF 6 and the signal to be compensated for from the input terminal 1 is destroyed. As a result, the lost low frequency component in the digital signal is not fully compensated for, so that the possibility is increased that an error occurs in determinating data.

The following measures to solve such a problem, are considered: (1) to increase the smoothing time constant of the level detector 10, and (2) to obtain an input to the level detector 10 from an output terminal 4 of the adder 2. However, in the above described method (1), a control signal is delayed as the smoothing time constant is increased. In addition, in the method (2), a feedback ratio must be restrained low so as to prevent oscillation of a system, so that compensation of a low frequency component is not fully made.

Meanwhile, as a supply source to the DC restoration circuit of the above described digital signal having its low frequency component lost, a recording/reproducing apparatus of the digital signal is known as described above. A typical recording/reproducing apparatus is a digital VTR for recording/reproducing a PCM (Pulse-Code Modulation) video signal utilizing a plurality of rotary heads.

FIG. 7 is a block diagram showing a reproducing system in such a conventional digital VTR, and FIG. 8 is a waveform diagram for explaining an operation of the digital VTR shown in FIG. 7.

In FIG. 7, recording/reproducing heads 13A and 13B are provided opposed to each other by 180° on a guide cylinder 11. In addition, a magnetic tape 12 serving as a recording media is wound around the guide cylinder 11. Windings 14A and 14A' and 14B and 14B' respectively constitute rotary transformers, which are connected to pre-amplifiers 15A and 15B respectively provided corresponding to heads 13A and 13B. Outputs from the pre-amplifiers 15A and 15B shown in FIGS. 8(a) and 8(b), i.e., reproduced outputs of the heads 13A and 13B are alternately selected by a switch 18. A PG head 22 for detecting rotation of a cylinder detects magnetic flux of each of magnets 21A and 21B provided on the guide cylinder 11. The magnets 21A and 21B are reversed in polarity. Thus, a signal having its polarity alternately reversed as shown in FIG. 8(c) is obtained from the PG head 22. An output signal of this PG head 22 is amplified by a amplifier 23 and then, separated for each polarity by comparators 24A and 24B. Outputs of the comparators 24A and 24B are respectively delayed by a predetermined time by delay circuits 25A and 25B, to be applied to a set input and a reset input of an R-S flip-flop 26. More specifically, the R-S flip-flop 26 is alternately set and reset by outputs of the delay circuits 25A and 25B. An output of the R-S flip-flop 26 shown in FIG. 8(d) is used for switching control of the switch 18 as an RF switching pulse. For example, a terminal 16A is selected and connected to a terminal 17 when the output of the R-S flip-flop 26 is at an "H" level, while a terminal 16B is selected and connected to the terminal 17 when the output is at an 37 L" level. By such a switching operation of the switch 18, the outputs of the pre-amplifiers 15A and 15B come to be continuous as shown in FIG. 8(e), i.e., combined, to be applied to a waveform equalizer 19. A reproduced digital signal from the wave form equalizer 19 is output through an output terminal 20.

Meanwhile, in the digital VTR shown in FIG. 7, a signal recorded on a magnetic tape 12 serving as a recording media comprises an effective signal section and a preamble portion and a postamble portion before and after the section, as shown in FIGS. 8(a) and 8(b). These preamble portions and postamble portion comprise a signal having a Nyquist frequency of data in the effective signal section, i.e., a signal having a frequency corresponding to the highest frequency of the recorded signal, in which portions there inherently exists no low frequency component unlike a data signal. A signal (in FIG. 8(e)) reproduced from the magnetic tape 12 by the reproducing system shown in FIG. 7 and output from the output terminal 20 is applied to a PLL (Phase-Locked Loop) circuit (not shown) after a DC component thereof is restored by the DC restoration circuit shown in FIG. 3 or 5. This PLL circuit causes a capturing operation to be completed during periods of the above described preamble portion and postamble portion in the input signal, to generate a clock signal synchronized with the signal having the above described Nyquist frequency. Determination whether data is at a high level or a low level in the effective signal section is made based on this clock signal. More specifically, as described above, if the preamble portion and the postamble portion are provided before and after the effective signal section so that the capturing operation of the PLL circuit is completed during the period thereof, a data determining operation in the effective signal section can be quickly performed.

However, in the digital VTR using rotary heads as shown in FIG. 7, intermittent signals as shown in FIGS. 8(a) and 8(b) must be made continuous by switching the switch 18, to be combined into an output signal as shown in FIG. 8(e). At the time point of switching of this switch 18, waveform distortion may be caused in the combined signal. As causes of such waveform distortion, the following are considered: (1) the difference in amplitute between reproduced outputs based on the respective differences in characteristics between magnetic heads and between respective transmission systems thereof, (2) discontinuity of phases of signals in the preamble portion and the postamble portion at the time of combination, and (3) spike-shaped switching noises in the preamble portion and the postamble portion.

FIGS. 9A and 9B are waveform diagrams for explaining a state in which such waveform distortion is caused. In FIGS. 9A and 9B, (a) shows a signal having a Nyquist frequency in the preamble portion and the postamble portion in the reproduced signal shown in FIG. 8(e) in an enlarged manner, and (b) shows a DC component extracted from the output signal of the reproducing system by the LPF 6 in the DC restoration circuit. In addition, in FIGS. 9A and 9B, a broken line represents timings for switching of the switch 18. For FIG. 9A, a signal cycle is continuous at the point in time of switching, so that an unnecessary low frequency component is not generated in an output of the LPF 6. However, for FIG. 9B, when reproduced signals from the heads are combined, a signal cycle becomes discontinuous at the point in time of switching due to the relative time difference. In this case, this discontinuous portion is extracted by the LPF 6 as a low frequency component, to be enlarged by the action of a feedback loop. The signal having a Nyquist frequency in the preamble portion is significantly lost due to such a low frequency component. Thus, the clock signal is not reproduced by the PLL circuit, so that it may be impossible to determine digital data. Furthermore, in order to prevent such a situation, it is necessary to set a longer period for the preamble portion. Consequently, the effective signal section must be shortened, so that a considerable amount of data can not be recorded. On the other hand, the measures to prevent a malfunction caused by drop out of a input signal is disclosed in, for example, Japanese Patent Laying-Open Gazette Nos. 16275/1987 and 129975/1985.

Additionally, in the reproducing system in the digital VTR shown in FIG. 7, the rotary transformers 14A and 14A′ and 14B and 14B′ are respectively provided corresponding to the heads 13A and 13B. Thus, there exist differences in frequency characteristics, amplitude level and the like between the respective output signals (in FIGS. 8(a) and 8(b)) (such a difference is referred to as a characteristic difference between channels hereinafter). Thus, in the DC restoration circuit shown in FIGS. 3 or 5, if a constant, i.e, feedback loop characteristics of the DC restoration circuit are set corresponding to characteristics of one channel, i.e., a system corresponding to any one of the magnetic heads, a compensation error occurs with respect to the other channel, so that the possibility becomes large that an error occurs in discriminating date.

SUMMARY OF THE INVENTION

Therefore, an object of the present invention is to provide a DC restoration circuit capable of fully compensating for a low frequency component in a input digital signal irrespective of the wandering of the base one of the input signal.

Another object of the present invention is to provide a DC restoration circuit in which waveform distortion is not enlarged by a feedback loop even if the waveform distortion is caused in a preamble portion at the time the input digital signal is formed.

Still another object of the present invention is to provide a DC restoration circuit in which an error does nor occur in compensating for a low frequency component even if a characteristic difference between channels exists in an input digital signal.

Still another object of the present invention is to provide a DC restoration circuit capable of fully compensating for a low frequency component irrespective of the wandering of the base line of the input signal even if a characteristic difference between channels exists.

Still another object of the present invention is to provide a DC restoration circuit capable of fully compensating for a low frequency component even if low frequency cut-off characteristics of an input digital signal are complicated.

Still another object of the present invention is to provide a digital signal reproducing apparatus capable of fully compensating for a low frequency component in a digital signal reproduced from a recording media, in which the possibility is reduced that an error occurs in determining data.

Briefly stated, the DC restoration circuit according to the present invention comprises an input terminal receiving a digital signal having its low frequency component cut off. A first adder has a first input terminal receiving the digital signal received by the input terminal, a second input terminal and an output terminal. A second adder has a first input terminal receiving the digital signal received by the input terminal, a second input terminal and an output terminal. A data determination circuit receives an output from the output terminal of the first adder for determining the digital signal. A filter receives an output of the data determination circuit for extracting a low frequency component therein. A variable gain amplifier has a control terminal, for amplifying the extracted low frequency component according to the gain changed depending on a level of a signal applied to the control terminal. An output of the variable gain amplifier being applied to the second input terminal of the first adder and the second input terminal of the second adder. The DC restoration circuit further includes a level detector for detecting a level of a signal from the output terminal of the second adder, to apply a signal corresponding to the level to the control terminal of the variable gain amplifier.

In accordance with another aspect of the present invention, the DC restoration circuit comprises an input terminal receiving a digital signal formed by sequentially selecting a plurality of digital signals respectively supplied from a plurality of channels and having their low frequency components cut off. A data determination circuit determines the received digital signal. A device constituting a feedback loop feeds back the low frequency component in an output of the data determination circuit to an input of the data determination circuit. A device cuts off the feedback loop over a predetermined period including the time of selecting the plurality of digital signals.

In accordance with still another aspect of the present invention, the DC restoration circuit comprises an input terminal receiving a digital signal formed by sequentially selecting a plurality of digital signals respectively supplied from a plurality of channels and having their low frequency components cut off. A data determination circuit determines the received digital signal. A device constituting a feedback loop has variable characteristics for feeding back a low frequency component in an output of the data determination circuit to an input of the data determination circuit. A device changes the characteristics of the feedback loop to characteristics suitable for each channel corresponding to the selected digital signal every time the digital signal is selected.

In accordance with still another aspect of the present invention, the DC restoration circuit comprises an input terminal receiving a digital signal formed by sequentially selecting a plurality of digital signals respectively supplied from a plurality of channels and having their low frequency components cut off. A first adder has a first input terminal receiving the digital signal received by the input terminal, a second input terminal and an output terminal. A second adder has a first input terminal receiving the digital signal received by the input terminal, a second input terminal and an output terminal. A data determination circuit receives an output from the output terminal of the first adder for determining the digital signal. A filter receives an output of the data determination circuit for extracting a low frequency component therein. A variable gain amplifier has a control terminal, for amplifying the extracted low frequency component according to the gain changed depending on a level of a signal applied to the control terminal. An output of the variable gain amplifier is applied to the second input terminal of the first adder and the second input terminal of the second adder. The DC restoration circuit further comprises a level detector for detecting a level of a signal from the output terminal of the second adder. A plurality of attenuators respectively attenuate an output of the level detector according to different attenuation factors. A switch selects the attenuator having the attenuation factor corresponding to the selected channel out of the plurality of attenuators every time the digital signal is selected, to apply an output thereof to a control terminal of the variable gain amplifier.

In accordance with still another aspect of the present invention, the DC restoration circuit comprises an input terminal receiving a digital signal having its low frequency component cut off. A data determination circuit determines the received digital signal. A device constituting a feedback loop feeds back an output of the data determination circuit to an input of the data determination circuit. The device constituting the feedback loop comprising a plurality of filters receiving the output of the data determination circuit for extracting a low frequency component therein while dividing the low frequency component into a plurality of bands, and an adder for adding outputs of the plurality of filters to feed back the result obtained by addition to the input of the data determination circuit.

In accordance with still another aspect of the present invention, the digital signal reproducing apparatus comprises a plurality of rotary magnetic heads for reproducing a digital signal from a media having the digital signal recorded thereon. A signal reproducing device is provided for each the plurality of rotary magnetic heads. A device forms a digital signal by sequentially selecting a plurality of digital signals reproduced by the signal reproducing device. A DC restoration circuit for compensates for a low frequency component in the formed digital signal. The DC restoration circuit comprises a first adder having a first input terminal receiving the formed digital signal, a second input terminal and an output terminal. A second adder has a first input terminal receiving the formed digital signal, a second input terminal and an output terminal. A data determination circuit receives an output from the output terminal of the first adder for determining the digital signal. A filter receives an output of the data determination circuit for extracting a low frequency component therein. A variable gain amplifier has a control terminal, for amplifying the extracted low frequency component according to the gain changed depending on a level of a signal applied to the control terminal. An output of the variable gain amplifier is applied to the second input terminal of the first adder and the second input terminal of the second adder. The DC restoration circuit further comprises a level detector device for detecting a level of a signal from the output terminal of the second adder to apply a signal corresponding to the level to the control terminal of the variable gain amplifier. A plurality of attenuator device attentuates an output of the level detector device according to different attenuation factors. A switch device selects the attenuator device having an attenuation factor corresponding to a selected magnetic head and signal reproducing device out of the plurality of attenuator means every time the digital signal is selected, to apply an output thereof to the control terminal of the variable gain amplifier. A device generates a signal defining a predetermined period including the time of selecting of a plurality of digital signals. A device makes the gain of the variable gain amplifier zero during a predetermined period in response to the signal defining the predetermined period.

Thus, a principal advantage of the present invention is that wandering of base line is restrained in an input signal to a level detector, so that the gain of a feedback loop can be controlled properly corresponding to a level of the input signal, whereby an error can be prevented from being caused by a DC restoration circuit in determining data.

Another advantage of the present invention is that a feedback loop in a DC restoration circuit is cut off in a period before and after switching when a plurality of reproduced outputs are sequentially selected to form an input digital signal, so that waveform distortion caused in a preamble portion at the time of switching can be prevented from being enlarged by the DC restoration circuit, whereby a clock for determining data can be precisely generated.

Still another advantage of the present invention is that characteristics of a feedback loop are switched for each channel when a plurality of reproduced outputs are sequentially selected to form an input digital signal, so that a low frequency component can be fully compensated with respect to each channel, whereby errors caused in determining data can be decreased.

A further advantage of the present invention is that a low frequency component is divided into a plurality of bands using a plurality of filters, so that the low frequency component can be fully compensated even if low frequency cut-off characteristics of an input digital signal are complicated.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a schematic block diagram showing a reproducing system in a digital VTR obtained by a combination of the first embodiment shown in FIG. 10, the second embodiment shown in FIG. 11 and the third embodiment shown in FIG. 13;

DESCRIPTION OF THE PREFERRED EMBODIMENTS

Figure 10:
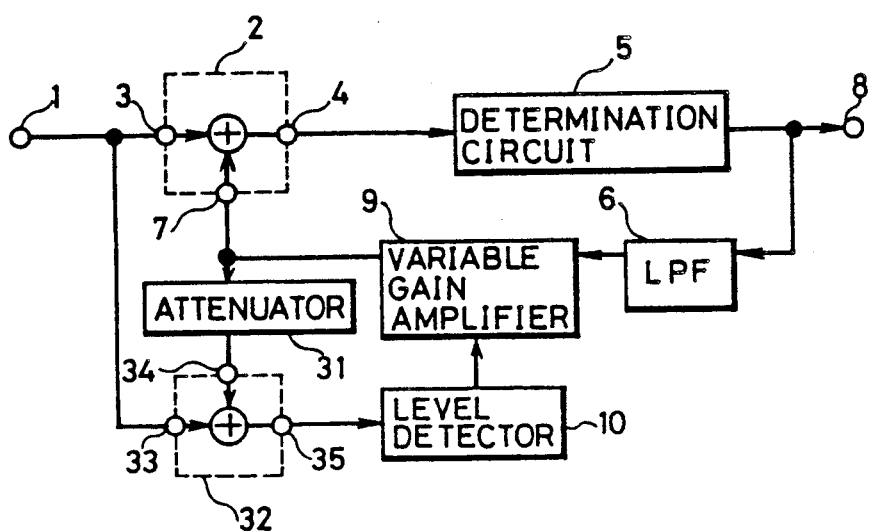
FIG. 10 is a schematic block diagram showing a DC restoration circuit according to a first embodiment of the present invention.
Figure 5:
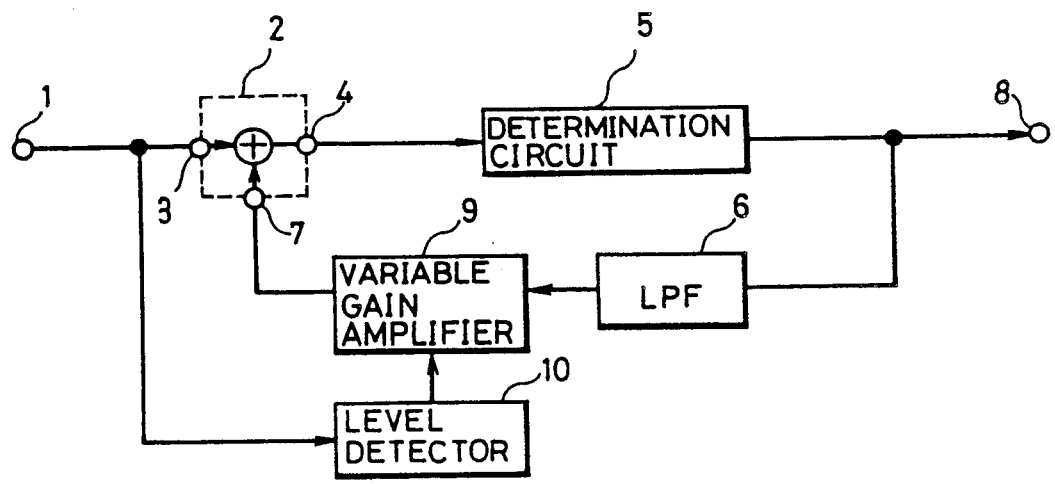
FIG. 5 is a schematic block diagram showing another example of the conventional DC restoration circuit.

FIG. 10 is a schematic block diagram showing a DC restoration circuit according to a first embodiment of the present invention, which is the same as the conventional DC restoration circuit shown in FIG. 5 except for the following.

Figure 6:
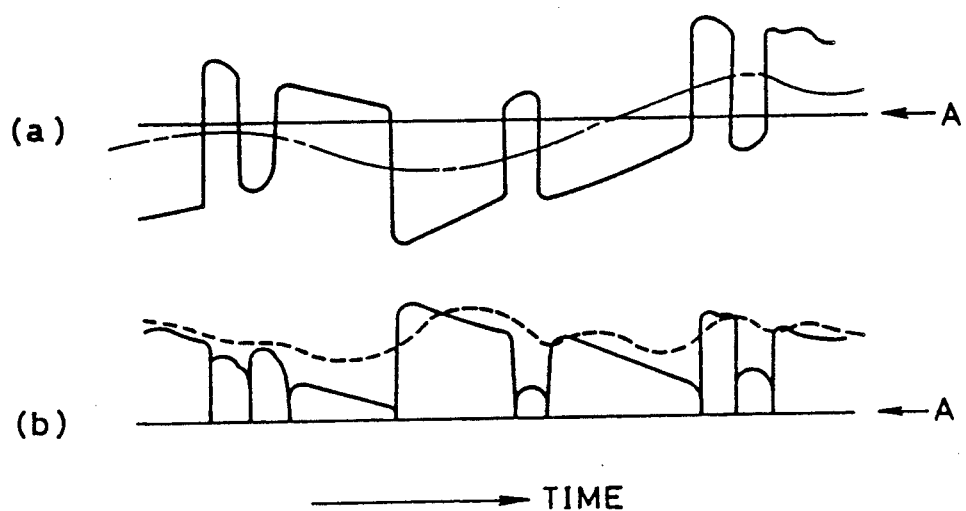
FIG. 6 consisting of (a) and (b) is a waveform diagram for explaining a problem concerning the circuit shown in FIG. 5.

More specifically, there are provided an attenuator 31 for attenuating an output of a variable gain amplifier 9 and an adder 32. The adder 32 has one input terminal 33 receiving an input digital signal from an input terminal 1, another input terminal 34 receiving an output of the attenuator 31, and an output terminal 35 connected to an input of a level detector 10. As described with reference to FIG. 5, this level detector 10 comprises a rectifier circuit and a smoothing circuit which are not shown, which outputs a signal proportional to the envelop of an input signal. The gain of the variable gain amplifier 9 is controlled in response to this output. The output of the attenuator 31 and an input digital signal from an input terminal 1 are added to each other by the adder 32, the result of the addition is applied as an input to this level detector 10. As a result, with respect to an input signal to the level detector 10, wandering of the base line as shown in FIG. 6(a) are restrained. More specifically, only when the amplitude of an input signal to the terminal 1 becomes large irrespective of wandering of the base line, the variable gain amplifier 9 is controlled such that the gain thereof becomes large. Thus, in a digital signal recording/reproducing apparatus such as a digital VTR, when the amplitude of the input signal wanders due to the change in the contact state of a head with a recording media, dust and flaws on the surface of the recording media, the feedback value can be precisely controlled according to the wandering. Thus, a malfunction can be prevented in which an output of the level detector 10 wanders due to the wandering of the base line of the input signal and the feedback value from an LPF 6 wanders irrespective of a level of the input signal itself, as in the conventional DC restoration circuit shown in FIG. 5.

Meanwhile, the attenuator 31 is inserted such that a feedback loop constituted by providing the adder 32 does not oscillate. The amount of attenuation value of the attenuator 31 is set to a suitable value in consideration of both the restraining effect on the wandering in the base line and the stability of the feedback loop.

Additionally, although in the embodiment shown in FIG. 10, an output of the variable gain amplifier 9 is used as one of the inputs of the adder 32 so that components are used in common, an output of the LPF 6 may be amplified according to the predetermined gain and then, applied to one of the inputs of the adder 32. Alternatively, an output of the data determination circuit 5 may be passed through a separately provided LPF and then, applied to one of the inputs of the adder 32.

As described in the foregoing, according to the first embodiment of the present invention as shown in FIG. 10, wandering in the base line is restrained in the input signal due to the level detector 10, so that the output of the level detector 10 properly corresponds to the level of the input signal. As a result, since the gain of the variable gain amplifier 9 is precisely controlled, an error does not occur in an operation of the DC restoration circuit, whereby an error can be prevented from being caused in determining data.

Figure 12:
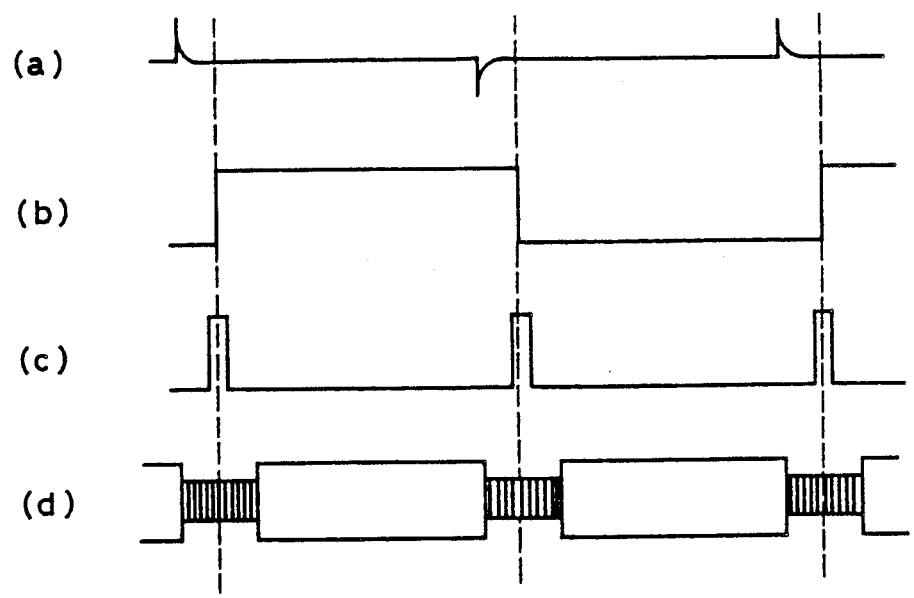
FIG. 12 consisting of (a)–(d), is a waveform diagram for explaining an operation of the digital VTR shown in FIG. 11.
Figure 11:
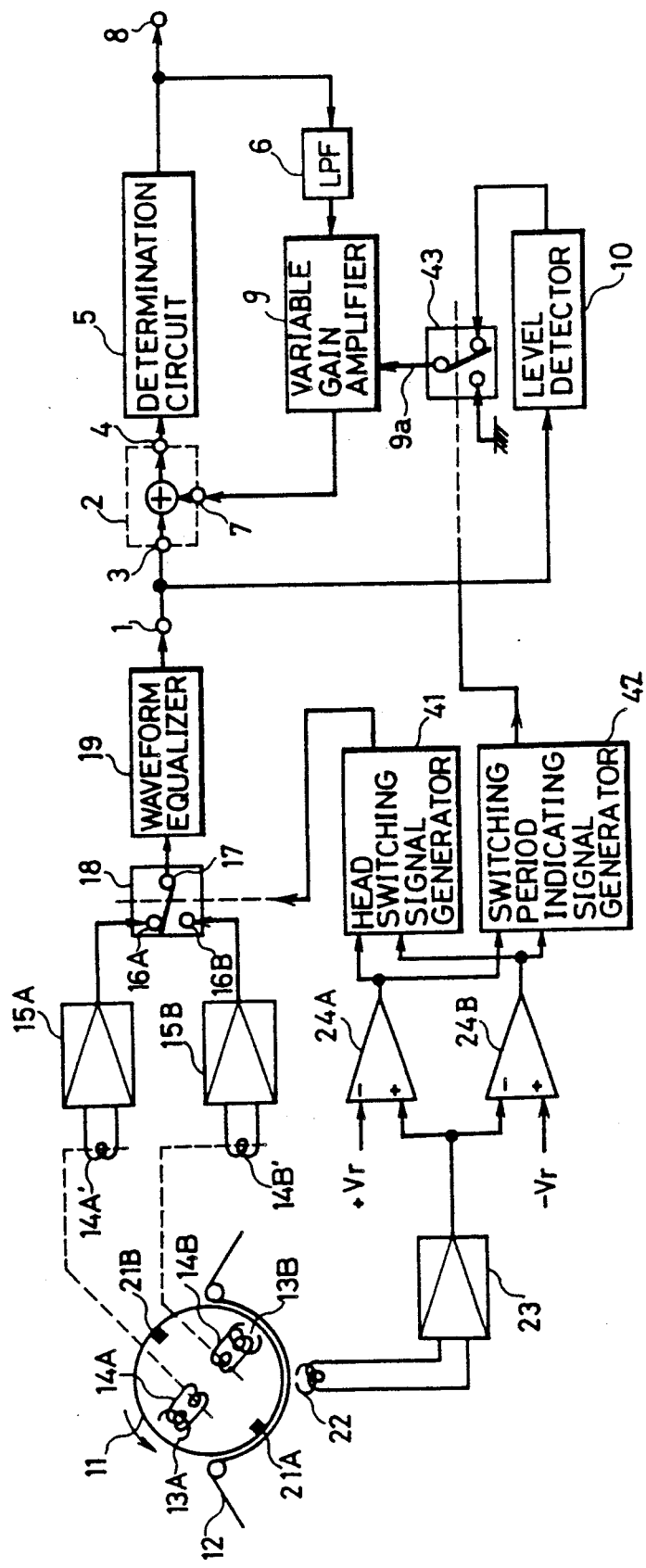
FIG. 11 is a schematic block diagram showing a reproducing system in a digital VTR according to a second embodiment of the present invention.

FIG. 11 is a block diagram showing a reproducing system in a digital VTR according to a second embodiment of the present invention, and FIG. 12 is a waveform diagram for explaining an operation of the embodiment shown in FIG. 11.

Figure 7:
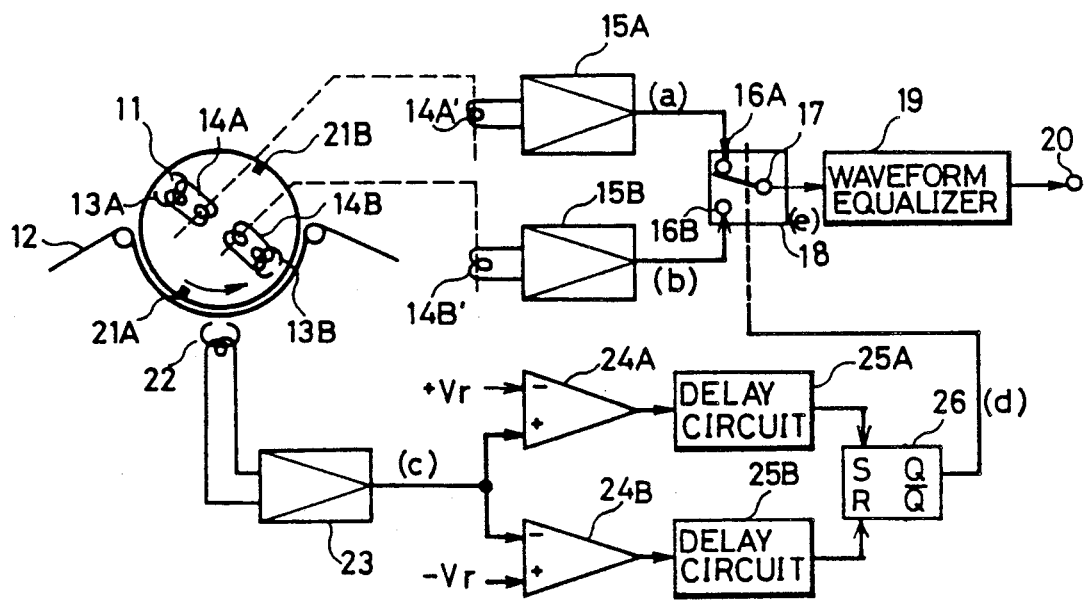
FIG. 7 is a block diagram showing a conventional reproducing system in a digital VTR.
Figure 8:
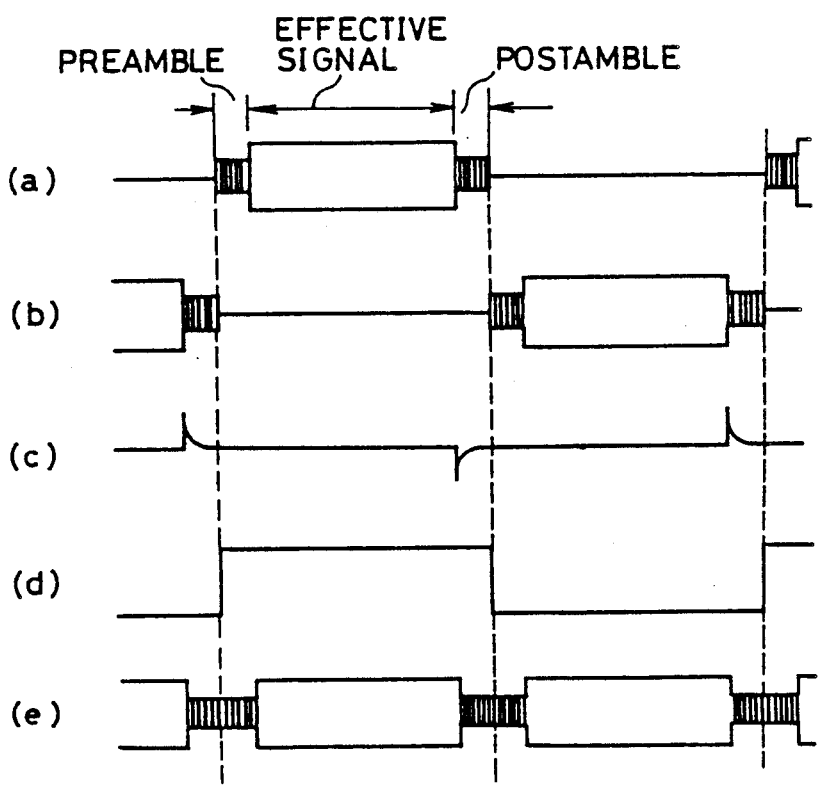
FIG. 8 consisting of (a)–(e), is a waveform diagram for explaining an operation of the digital VTR shown in FIG. 7.

The embodiment shown in FIG. 11 comprises the reproducing system in the digital VTR shown in FIG. 7 and the DC restoration circuit shown in FIG. 5 except for the following. More specifically, in FIG. 11, a head switching signal generator 41 comprises the delay circuits 25A and 25B and the R-S flip-flop 26 as shown in FIG. 7. A switching period indicating signal generator 42 newly provided comprises a delay circuit (not shown) having a shorter delay time than those of the delay circuits 25A and 25B, and a monostable multivibrator (not shown) providing an output which is at a high level during a constant period. In addition, there is provided a switch 43 for selectively connecting a control terminal 9a of a variable gain amplifier 9 to an output of a level detector 10 or a ground potential. The switching is controlled by a switching period indicating signal from the switching period indicating signal generator 42.

More specifically, the switch 43 selects the ground potential in a period during which an output of the switching period indicating signal generator 42 is at a high level while selecting the output of the level detector 10 in a period during which it is at a low level. Furthermore, the variable gain amplifier 9 is structured such that the control terminal 9a thereof is grounded so that the gain thereof is controlled to zero. Thus, when the switching period indicating signal output from the switching period indicating signal generator 42 is at a high level, the feedback loop in a DC restoration circuit, which comprises the variable gain amplifier 9, is cut off. A signal having its polarity alternately inverted as shown in FIG. 12(a) is obtained from a PG head 22. An RF switching pulse (FIG. 12(b)) is generated from an R-S flip-flop (not shown) contained in the head switching signal generator 41 in response to the signal. It is assumed that the delay time of the delay circuit (not shown) and the quasi-stable period of the monostable multivibrator (not shown) in the switching period indicating signal generator 42 are determined such that the switching period indicating signal from the switching period indicating signal generator 42 is at a high level in a predetermined period including the rising time point or the falling time point of this RF switching pulse, i.e., at the time of switching of a switch 18.

First, when the switching period indicating signal is at a low level, the output of the level detector 10 is applied to the control terminal 9a of the variable gain amplifier 9 by the switch 43, so that the gain of the variable gain amplifier 9 is controlled according to a level of the digital signal (FIG. 12(d)) input to an input terminal 1 of the DC restoration circuit, whereby a low frequency component is fully compensated.

Figure 9A:
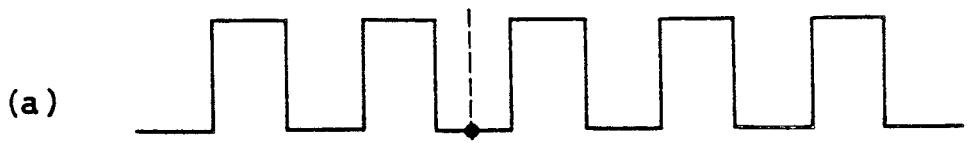
FIGS. 9A (a) and (b) and 9B (a) and (b) are waveform diagrams for explaining a state in which waveform distortion is caused in an input digital signal.
Figure 9B:
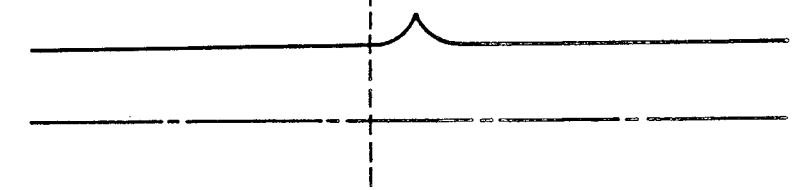

On the other hand, when the switching period indicating signal is at a high level before and after the point in time of switching of the switch 18, the ground potential is applied to the control terminal 9a of the variable gain amplifier 9 by the switch 43, so that the gain of the variable gain amplifier 9 becomes zero, whereby the feedback loop is cut off. Consequently, the DC restoration circuit is not operated. Thus, even if at the in time point of switching of the switch, waveform distortion is caused by discontinuity of a signal cycle as shown in, for example, FIG. 9B, a low frequency component is not likely to appear at an output terminal 8 while being extracted by the LPF 6 and enlarged by the action of the feedback loop.

A period during which the switching period indicating signal is at a high level corresponds to the quasi-stable period of the monostable multivibrator included in the switching period indicating signal generator 42. This period is set to the time elapsed until an output (FIG. 9B(b)) of the LPF 6, based on waveform distortion of the signal applied to the input terminal 1 at the switching time point, becomes considerably small. Thus, this period is individually determined based on characteristics of the LPF 6.

Although in the above described high level period, an operation of the DC restoration circuit is stopped, no particular problem occurs because a preamble portion and a postamble portion do not inherently include a low frequency component.

Figure 3:
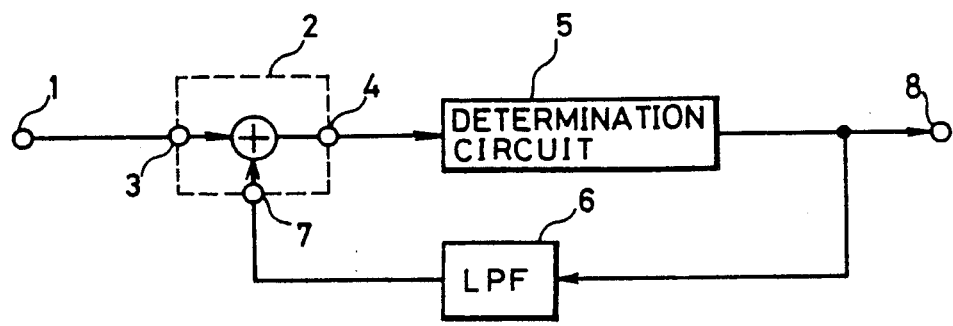
FIG. 3 is a schematic block diagram showing one example of a conventional DC restoration circuit.
Figure 4:
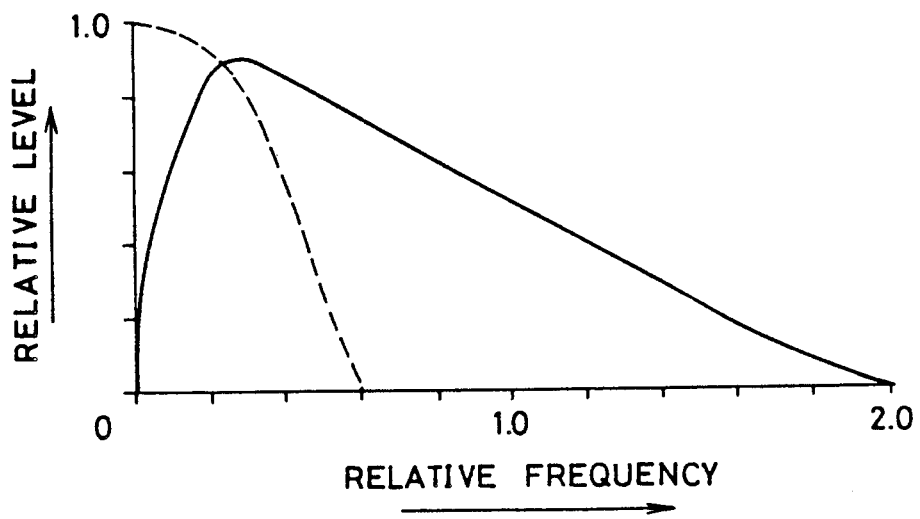
FIG. 4 is a diagram showing frequency characteristics of the circuit shown in FIG. 3.

Additionally, although in the embodiment shown in FIG. 11, the gain of the variable gain amplifier 9 is controlled so that the feedback loop is cut off, a switch may be separately provided in the feedback loop so that the feedback loop is cut off. More specifically, in the second embodiment, the variable gain amplifier is not an essential component. Also for a combination of the restoration system shown in FIG. 7 and the DC restoration circuit shown in FIG. 3, a switch may be provided in a feedback loop so that this feedback loop is cut off, to obtain the same effect.

As described in the foregoing, according to the second embodiment of the present invention, if and when reproduced outputs from magnetic heads are combined, the feedback loop in the DC restoration circuit is cut off over a period before and after switching, so that waveform distortion caused in the preamble portion at the time of switching can be prevented from being enlarged by the DC restoration circuit.

Figure 13:
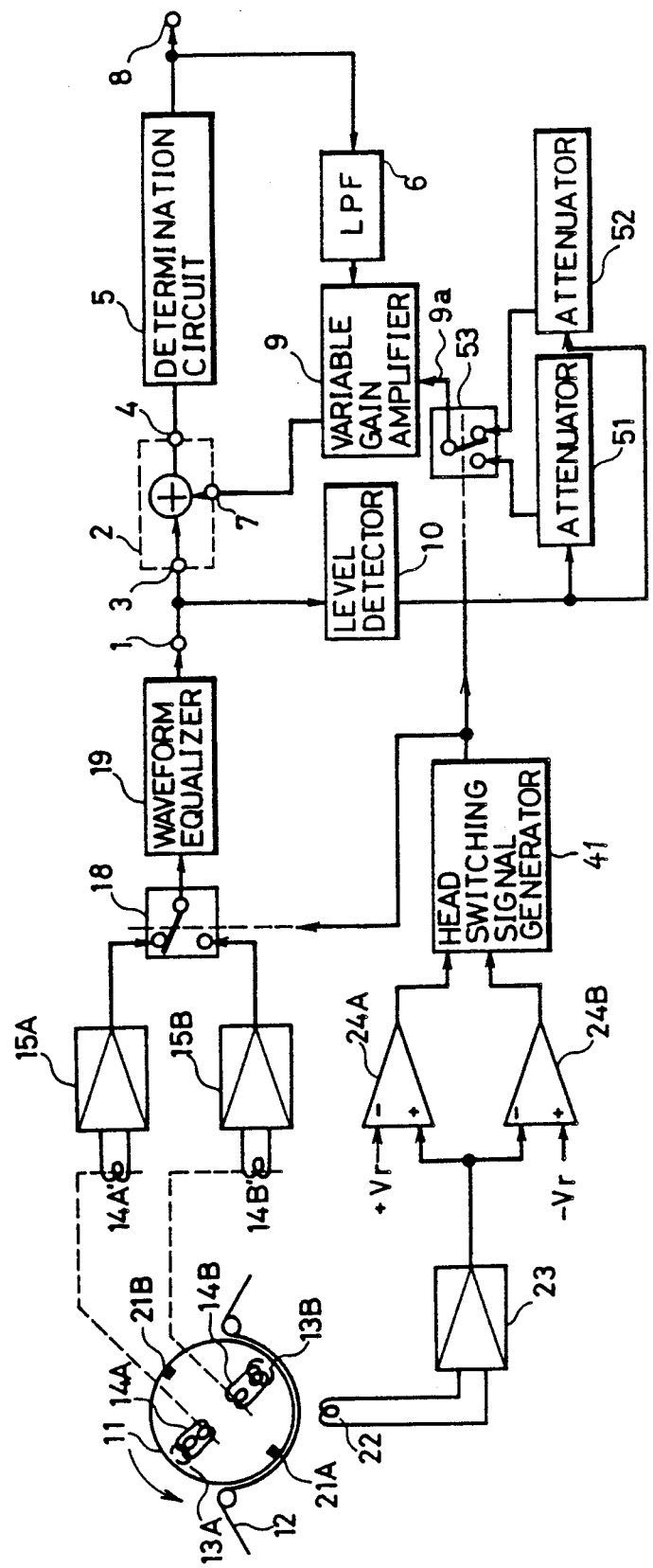
FIG. 13 is a schematic block diagram showing a reproducing system in a digital VTR according to a third embodiment of the present invention.

FIG. 13 is a block diagram showing a reproducing system in a digital VTR according to the third embodiment of the present invention.

The embodiment shown in FIG. 13 is the same as the second embodiment shown in FIG. 11 except for the following. More specifically, the switching period indicating signal generator 42 shown in FIG. 11 is not provided. Alternatively, there is provided a switch 53, the switching of which is controlled by an RF switching pulse which is an output of a head switching signal generator 41. In addition, an output of a level detector 10 is applied to attenuators 51 and 52 respectively making a level adjustment corresponding to reproduced outputs from magnetic heads 13A and 13B. The above described switch 53 selects an output of either one of the attenuators 51 and 52 in response to the RF switching pulse from the head switching signal generator 41, to apply the same to a control terminal 9a of a variable gain amplifier 9. More specifically, the attenuator 51 or 52 corresponding to each head and a transmission system thereof is selected according to switching of the magnetic heads 13A and 13B.

Figure 14:
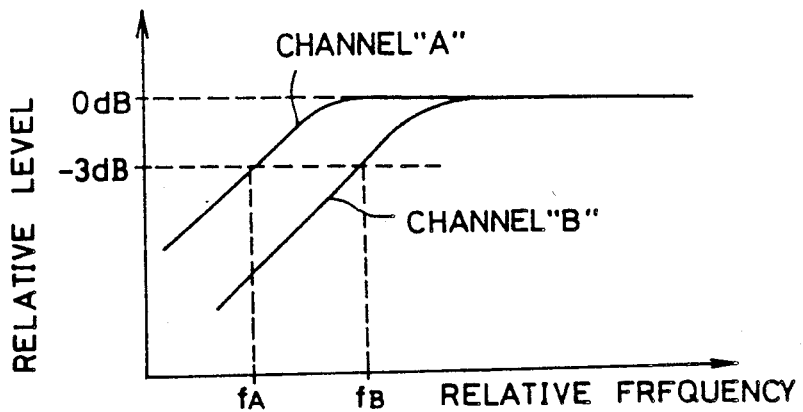
FIG. 14 is a diagram showing frequency characteristics of each channel in the digital VTR shown in FIG. 13.

As described above, a characteristics difference between channels exists between reproduced signals from the magnetic heads. For example, FIG. 14 is a diagram showing frequency characteristics of each channel. As shown in FIG. 14, the head 13A and the transmission system thereof (referred to as channel A hereinafter) differ from the head 13B and the transmission system thereof (referred to as B hereinafter) in low frequency characteristics. When characteristics of an LPF 6 included in the feedback loop of the DC restoration circuit are made coincident with, for example, the channel A, a low frequency component is precisely compensated for with respect to the channel A while a compensation error occurs with respect to the channel B.

Figure 15:
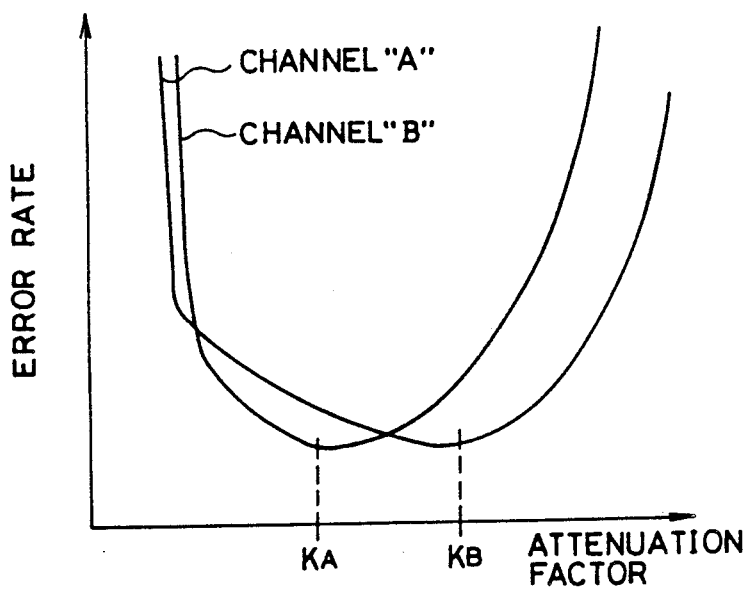
FIG. 15 is a diagram showing the relation between the attenuation factor and the error rate of each channel in the digital VTR shown in FIG. 13.

In the embodiment shown in FIG. 13, the attenuation factor of the attenuator 52 is set to a value different from that of the attenuator 51, and the feedback value of the low frequency component differs from channel to channel such that an error rate of binary data of each channel is minimized. For example, FIG. 15 is a diagram showing the relationship between the attenuation factor and the error rate of each channel. As shown in FIG. 15, since attenuation factors $K_A$ and $K_B$, each having the minimum error rate differ from each other for each channel A and B, the attenuation factors $K_A$ and $K_B$ of the attenuators 51 and 52 are adjusted, so that a compensating operation of the low frequency component in the DC restoration circuit can be fully set with respect to each channel.

As described in the foregoing, according to the third embodiment of the present invention as shown in FIG. 13, in the DC restoration circuit having as an input a digital signal obtained by making the reproduced outputs of the channels, continuous characteristics of the feedback loop are switched for each channel, so that the low frequency component can be fully compensated with respect to each channel. Thus, errors caused in determining data can be decreased.

Figure 17:
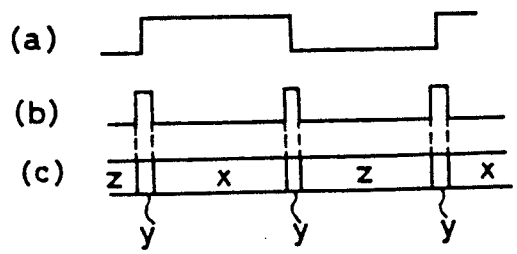
FIG. 17, consisting of (a)–(c), is a waveform diagram for explaining an operation of the digital VTR shown in FIG. 16.

FIG. 16 is a block diagram showing a reproducing system in a digital VTR obtained by a combination of the first embodiment shown in FIG. 10, the second embodiment shown in FIG. 11 and the third embodiment shown in FIG. 13, and FIG. 17 is a waveform diagram for explaining an operation thereof.

In the apparatus shown in FIG. 16, a DC restoration circuit as shown in FIG. 10 is basically used. Wandering of the base line is restrained in an input of a level detector 10, so that an output of the level detector 10 properly corresponds to a signal level at a terminal 1.

Additionally, in FIG. 16, there are provided attenuators 61 and 62 for adjusting a level of the output of the level detector 10 and a switch 63. The switch 63, the switching of which is controlled by an RF switching pulse (FIG. 17(a)) from a head switching signal generator 41 and a switching period indicating signal (FIG. 17(b)) from a switching period indicating signal generator 42, selects any one of a terminal x receiving an output of the attenuator 61, a terminal z receiving an output of the attenuator 62 and a terminal y as grounded, to connect the same to a control terminal 9a of the variable gain amplifier 9. More specifically, as shown in FIG. 17(c), the terminal y is selected so that a feedback loop is cut off when the switching period indicating signal (FIG. 17(b)) is at a high level, while the terminals x and z are alternately selected in response to the RF switching pulse (FIG. 17(a)) when it is at a low level. In such a structure, characteristics of the feedback loop can be changed to more suitable ones according to a characteristics difference between channels, and waveform distortion of a preamble portion at the time of switching of switch 18 can be prevented from being enlarged by the DC restoration circuit.

When a characteristics difference between channels is large, more compensation errors generally occurs than in the normal case due to the wanderings of the base line with respect to one of the channels. However, these compensation errors can be effectively decreased by combining the first and third embodiments as shown in FIG. 16.

Although in the above described embodiment, the gain in the feedback loop of the DC restoration circuit is changed so that a low frequency component is compensated corresponding to a characteristic difference between channels, characteristics of an LPF 6 may be switched for each channel, to obtain the same effect.

In the above described embodiments, an LPF is used in the feedback loop in the DC restoration circuit. However, in the digital VTR, low frequency cut-off characteristics of recording and reproducing are very complicated, so that a low frequency component can not be fully compensated by using only the LPF. In the digital VTR as shown in the above described embodiments, a rotary transformer is used for signal transmission between a magnetic head and a signal reproducing circuit. Thus, as low frequency cut-off factors, the effect of this rotary transformer in addition to the magnetic head can not be ignored, so that the low frequency cut-off characteristics of a reproduced signal may be complicated.

Figure 18:
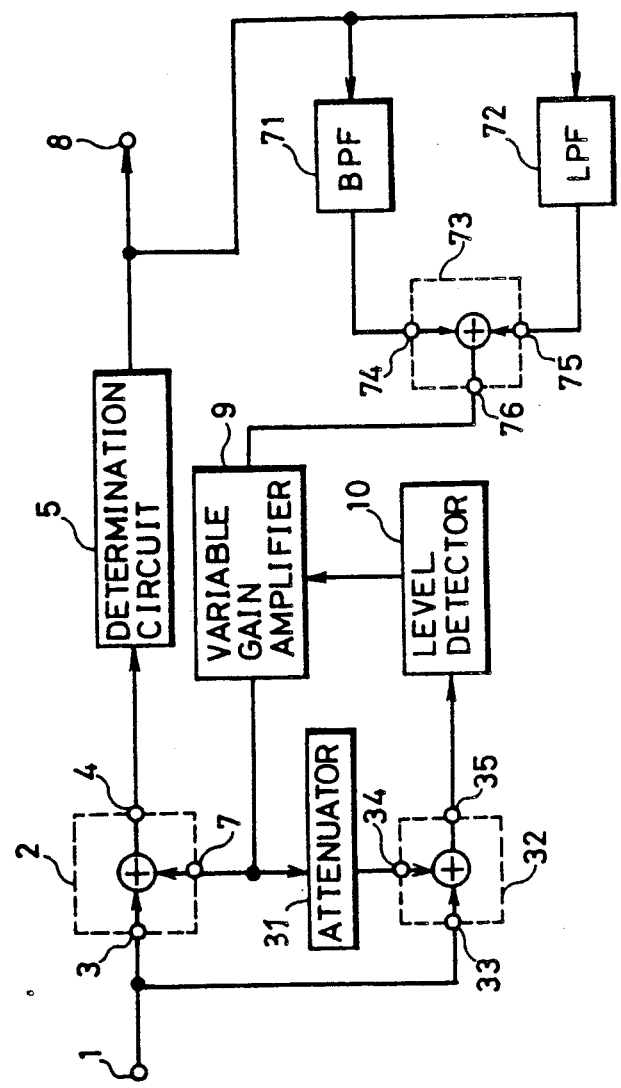
FIG. 18 is a schematic block diagram showing a still modified example of the DC restoration circuit according to the first embodiment of the present invention as shown in FIG. 10.

FIG. 18 is a diagram showing a further modified example of the DC restoration circuit according to the first embodiment of the present invention as shown in FIG. 10, which is proposed to solve such a problem.

The DC restoration circuit shown in FIG. 18 is the same as the DC restoration circuit shown in FIG. 10 except for the following. An output of a data determination circuit 5 is applied to a bandpass filter (referred to as BPF hereinafter) 71 and an LPF 72. An output of the BPF 71 is applied to one input terminal 74 of an adder 73, and an output of the LPF 72 is applied to the other input terminal 75. The adder 73 has its output terminal 76 connected to an input of a variable gain amplifier 9. A low frequency component in a data signal from the determination circuit 5 is extracted using the BPF 71 and the LPF 72. The outputs of both the filters 71 and 72 are added by the adder 73, and the result is further added to an input digital signal, to compensate for the low frequency component.

Considering a magnetic head and a rotary transformer in a digital VTR as a plurality of low frequency cut-off factors, a low frequency cut-off time constant $T_H$ is assumed to be inherent to the magnetic head, a low frequency cut-off time constant $T_L$ is assumed to be inherent to a rotary transformer, and attenuation characteristics are respectively indicated as a primary high-pass filter.

Figure 1:
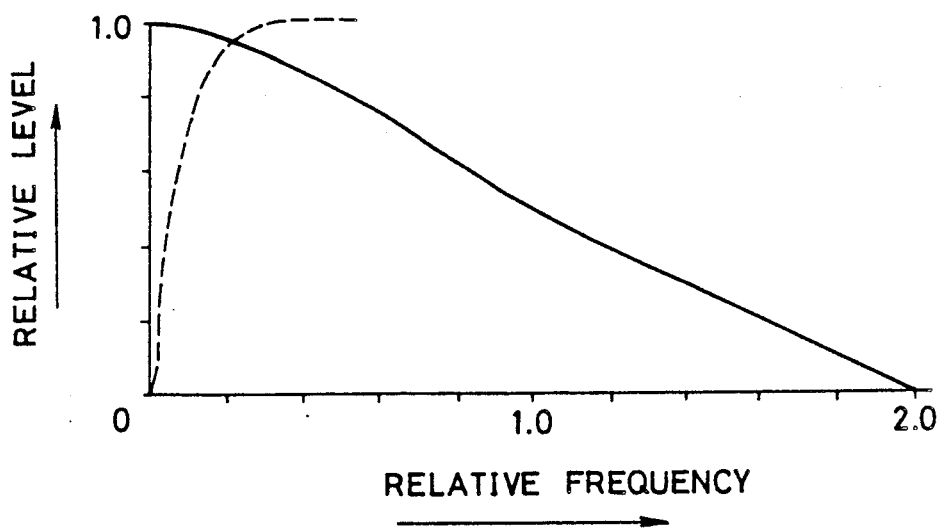
FIG. 1 is a diagram showing frequency characteristics of a digital signal applied to a DC restoration circuit.
Figure 2:
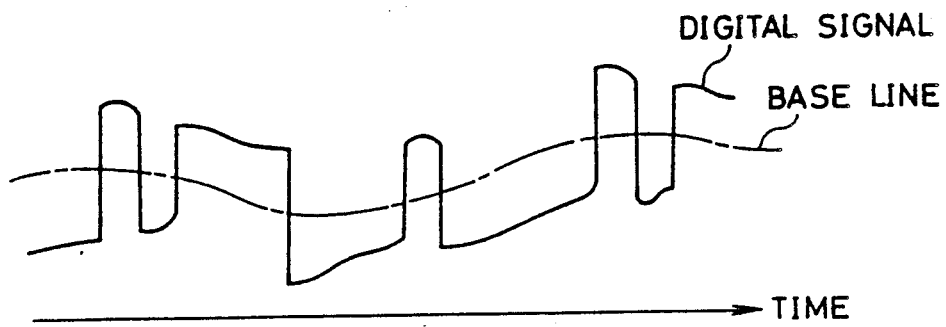
FIG. 2 is a waveform diagram showing a digital signal having a wandering base line.
Figure 19:
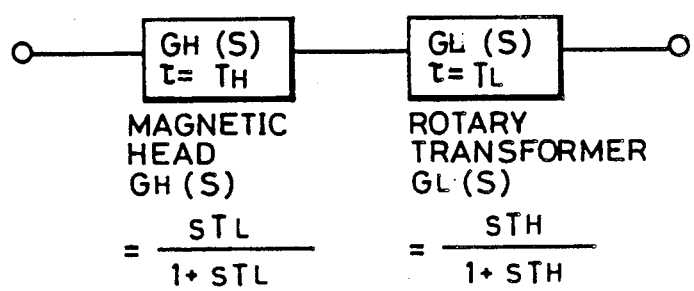
FIG. 19 is a diagram showing diagrammatically the principle of the embodiment shown in FIG. 18.

FIG. 19 is a diagram showing transfer functions of such a magnetic head and rotary transformer. In FIG. 19, it is assumed that a transfer function of the magnetic head is $G_H(S)$, and a transfer function of the rotary transformer is $G_L(S)$.

Thus, assuming that an overall transfer function of a system comprising the magnetic head and the rotary transformer is G(S), G(S) is represented by the following equation:

$$G(S) = \frac{ST_L}{1+ST_L} \cdot \frac{ST_H}{1+ST_H} = \frac{S^2 T_L T_H}{(1+ST_L)(1+ST_H)} \quad (1)$$

Figure 20:
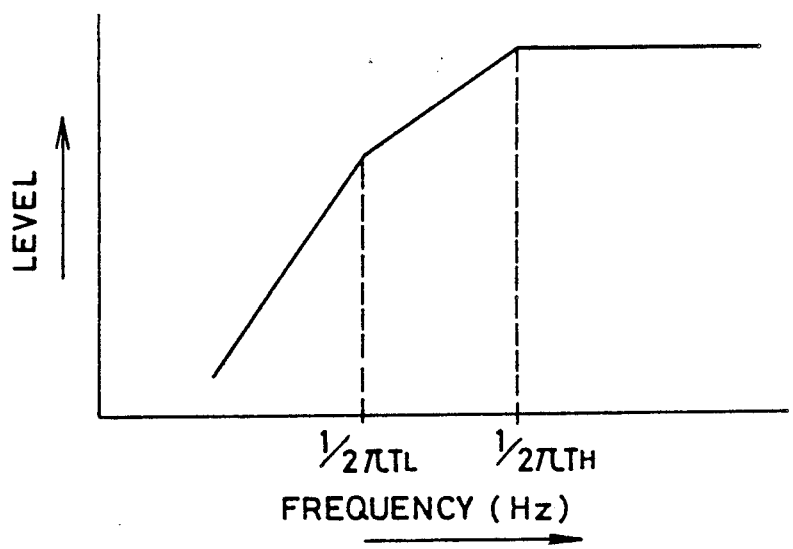
FIG. 20 is a diagram showing frequency characteristics of the circuit shown in FIG. 18.

In particular, if $T_L > T_H$, overall frequency characteristics of the system comprising the magnetic head and the rotary transformer are as shown in, for example, FIG. 20.

In order to restore the signal while passed through the system having such a transfer function G(S) to the original signal, it is necessary to produce a compensation signal based on a transfer function H(S) satisfying the following equation and combine the same with the input signal:

$$G(S)+H(S)=1 \quad (2)$$

Thus, H(S) is as follows:

$$H(S) = 1 - G(S) = \frac{1+S(T_L+T_H)}{(1+ST_L)(1+ST_H)} \quad (3)$$
$$= \frac{1}{1+ST_L} + \frac{ST_L}{(1+ST_L)(1+ST_H)}$$

The first term in the equation (3) can be achieved as a primary low-pass filter having a cut-off frequency $f_L = \frac{1}{2}\pi T_L$, and the second term therein can be achieved as a primary bandpass filter having a low cut-off frequency $f_L = \frac{1}{2}\pi T_L$ and a high cut-off frequency $f_H = \frac{1}{2}\pi T_H$.

Thus, in the structure shown in FIG. 18, complicated attenuation of a low frequency component caused by the magnetic head and the rotary transfer can be surely compensated.

Even if H(S) is transformed, the best pass characteristics can be obtained by a combination of different filters.

Compensation for a low frequency component by a combination of such a plurality of pass filters is not limited to the example shown in FIG. 18. For example, the compensation can be achieved in the DC reproducing circuit shown in FIGS. 3, 5, 11, 13 and 16, to obtain the same effect.

As described in the foregoing, according to the embodiment shown in FIG. 18, even if there exist a plurality of low frequency cut-off factors of an input digital signal, a low frequency component can be fully compensated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A direct current restoration circuit compensating for a low frequency component in a digital signal, comprising:

input means for receiving a digital signal having a low frequency component cut off, first adder means having a first input terminal receiving said digital signal received by said input means, a second input terminal and an output terminal, second adder means having a first input terminal receiving said digital signal received by said input means, a second input terminal and an output terminal, data determination means receiving an output from said output terminal of said first adder means for determining the digital signal, filter means receiving an output of said data determination means for extracting a low frequency component therein, variable gain amplifier means having a control terminal, for amplifying said extracted low frequency component according to the gain changed depending on a level of a signal applied to said control terminal, an output of said variable gain amplifier means being applied to the second input terminal of said first adder means and the second input terminal of said second adder means, and level detector means for detecting a level of a signal from the output terminal of said second adder means, to apply a signal corresponding to said level to the control terminal of said variable gain amplifier means.

2. The direct current restoration circuit according to claim 1, which further comprises attenuator means between the output of said variable gain amplifier means and the second input terminal of said second adder means.

3. The direct current restoration circuit according to claim 1, wherein pass characteristics of said filter means are approximately equal to cut-off characteristics of the low frequency component in said digital signal.

4. The direct current restoration circuit according to claim 3, wherein said filter means comprises a plurality of filters receiving the output of said data determination means for extracting the low frequency component therein while dividing the low frequency component into a plurality of bands, and third adder means for adding outputs of said plurality of filters, to apply the result obtained by addition to an input of said variable gain amplifier means.

5. The direct current restoration circuit according to claim 1, wherein said level detector means comprises means for rectifying and smoothing an applied signal.

6. A direct current restoration circuit compensating for a low frequency component in a digital signal, comprising:

input means for receiving a digital signal formed by sequentially selecting a plurality of digital signals respectively supplied from a plurality of channels and having their low frequency components cut off, data determination means for determining said received digital signal, means constituting a feedback loop for feeding back the low frequency component in an output of said data determination means to an input of said data determination means, and means for cutting off said feedback loop over a predetermined period including the time of selecting of said plurality of digital signals.

7. The direct current restoration circuit according to claim 6, wherein said means constituting the feedback loop comprises filter means receiving the output of said data determination means for extracting the low frequency component therein, variable gain amplifier means having a control terminal, for amplifying said extracted low frequency component according to the gain changed depending on a level of a signal applied to said control terminal, first adder means having a first input terminal receiving said digital signal received by said input means, a second input terminal receiving an output of said variable gain amplifier means, and an output terminal connected to the input of said data determination means, and level detector means for detecting a level of said digital signal received by said input means, to apply a signal corresponding to said level to the control terminal of said variable gain amplifier means.

8. The direct current restoration circuit according to claim 7, wherein said cut-off means comprises means for generating a signal defining a predetermined period including the time of selecting of said plurality of digital signals, and means responsive to the signal defining said predetermined period for making zero the gain of said variable gain amplifier means during said predetermined period.

9. The direct current restoration circuit according to claim 8, wherein said means for making the gain zero comprises switch means responsive to the signal defining said predetermined period for grounding the control terminal of said variable gain amplifier means during said predetermined period.

10. The direct current restoration circuit according to claim 7, wherein pass characteristics of said filter means are approximately equal to cut-off characteristics of the low frequency component in said digital signal.

11. The direct current restoration circuit according to claim 10, wherein said filter means comprises a plurality of filters receiving an output of said data determination means for extracting the low frequency component therein while dividing the low frequency component into a plurality of bands, and second adder means for adding outputs of said plurality of filters, to apply the result obtained by addition to the input of said variable gain amplifier means.

12. The direct current restoration circuit according to claim 7, wherein said level detector means comprises means rectifying and smoothing an applied signal.

13. A direct current restoration circuit compensating for a low frequency component in a digital signal, comprising:
input means for receiving a digital signal formed by sequentially selecting a plurality of digital signals respectively supplied from a plurality of channels and having low frequency components cut off,
data determination means for determining said received digital signal,
means constituting a feedback loop having variable characteristics for feeding back a low frequency component in an output of said data determination means to an input of said data determination means, and
means for changing the characteristics of said feedback loop to characteristics suitable for each channel corresponding to the selected digital signal every time said digital signal is selected.

14. The direct current restoration circuit according to claim 13, wherein said means constituting the feedback loop comprises
filter means receiving the output of said data determination means for extracting the low frequency component therein,
variable gain amplifier means having a control terminal, for amplifying said extracted low frequency component according to the gain changed depending on a level of a signal applied to said control terminal,
first adder means having a first input terminal receiving said digital signal received by said input means, a second input terminal receiving an output of said variable gain amplifier means and an output terminal connected to an input of said data determination means, and
level detector means for detecting a level of said digital signal received by said input means, to apply a signal corresponding to said level to the control terminal of said variable gain amplifier means.

15. The direct current restoration circuit according to claim 14, wherein said characteristics changing means comprises
a plurality of attenuator means for respectively attenuating an output of said level detector means according to different attenuation factors, and
switch means for selecting the attenuator means having the attenuation factor corresponding to the selected channel out of said plurality of attenuator means every time said digital signal is selected, to apply an output thereof to the control terminal of said variable gain amplifier means.

16. The direct current restoration circuit according to claim 15, which further comprises means for generating a signal defining a predetermined period including the time of selecting of said plurality of digital signals,
said switch means further comprising means responsive to the signal defining said predetermined period for making zero the gain of said variable gain amplifier means during said predetermined period.

17. The direct current restoration circuit according to claim 14, wherein
pass characteristics of said filter means are approximately equal to cut-off characteristics of the low frequency component in said digital signal.

18. The direct current restoration circuit according to claim 17, wherein said filter means comprises a plurality of filters receiving the output of said data determination means for extracting the low frequency component therein while dividing the low frequency component into a plurality of bands, and
second adder means for adding outputs of said plurality of filters, to apply the result obtained by addition to an input of said variable gain amplifier means.

19. The direct current restoration circuit according to claim 14, wherein
said level detector means comprises means for rectifying and smoothing an applied signal.

20. A direct current restoration circuit compensating for a low frequency component in a digital signal, comprising:
input means for receiving a digital signal formed by sequentially selecting a plurality of digital signals respectively supplied from a plurality of channels and having their low frequency components cut off,
first adder means having a first input terminal receiving said digital signal received by said input means, a second input terminal and an output terminal,
second adder means having a first input terminal receiving said digital signal received by said input means, a second input terminal and an output terminal,
data determination means receiving an output from said output terminal of said first adder means for determining the digital signal,
filter means receiving an output of said data determination means for extracting a low frequency component therein,
variable gain amplifier means having a control terminal, for amplifying said extracted low frequency component according to the gain changed depending on a level of a signal applied to said control terminal,
an output of said variable gain amplifier means being applied to the second input terminal of said first adder means and the second input terminal of said second adder means,
level detector means for detecting a level of a signal from the output terminal of said second adder means,
a plurality of attenuator means for respectively attenuating an output of said level detector means according to different attenuation factors, and
switch means for selecting the attenuator means having the attenuation factor corresponding to the selected channel out of said plurality of attenuator means every time said digital signal is selected, to apply an output thereof to the control terminal of said variable gain amplifier means.

21. A direct current restoration circuit compensating for a low frequency component in a digital signal, comprising:
an input means for receiving a digital signal having a low frequency component cut off,
data determination means for determining said received digital signal, and
means constituting a feedback loop for feeding back an output of said data determination means to an input of said data determination means,
said means constituting the feedback loop comprising
a plurality of filter means receiving the output of said data determination means for extracting a low frequency component therein while dividing the low frequency component into a plurality of bands, and adder means for adding outputs of said plurality of filters to feed back the result obtained by addition to the input of said data determination means.

22. A digital signal reproducing apparatus comprising:

a plurality of rotary magnetic heads for reproducing a digital signal from a media having said digital signal recorded thereon, signal reproducing means provided for each said plurality of rotary magnetic heads, means for forming a digital signal by sequentially selecting a plurality of digital signals reproduced by said signal reproducing means, and direct current restoration circuit compensating for a low frequency component in said formed digital signal, said direct current restoration circuit comprising first adder means having a first input terminal receiving said formed digital signal, a second input terminal and an output terminal, second adder means having a first input terminal receiving said formed digital signal, a second input terminal and an output terminal, data determination means receiving an output from the output terminal of said first adder means for determining the digital signal, filter means receiving an output of said data determination means for extracting a low frequency component therein, variable gain amplifier means having a control terminal, for amplifying said extracted low frequency component according to the gain changed depending on a level of a signal applied to said control terminal, an output of said variable gain amplifier means being applied to the second input terminal of said first adder means and the second input terminal of said second adder means, said direct current restoration circuit further comprising level detector means for detecting a level of a signal from the output terminal of said second adder means, to apply a signal corresponding to said level to the control terminal of said variable gain amplifier means, a plurality of attenuator means for respectively attenuating an output of said level detector means according to different attenuation factors, switch means for selecting the attenuator means having the attenuation factor corresponding to a selected magnetic head and signal reproducing means out of said plurality of attenuator means every time said digital signal is selected, to apply an output thereof to the control terminal of said variable gain amplifier means, means for generating a signal defining a predetermined period including the time of selecting of said plurality of digital signals, and means responsive to said signal defining the predetermined period for making zero the gain of said variable gain amplifier means during said predetermined period.

23. The digital signal reproducing apparatus according to claim 22, wherein pass characteristics of said filter means are approximately equal to cut-off characteristics of the low frequency component in said digital signal.

24. The digital signal reproducing apparatus according to claim 23, wherein said filter means comprises a plurality of filters receiving the output of said data determination means for extracting the low frequency component thereof while dividing the low frequency component into a plurality of bands, and third adder means for adding outputs of said plurality of filters, to apply the result obtained by addition to an input of said variable gain amplifier means.

25. The digital signal reproducing apparatus according to claim 22, wherein said level detector means comprises means for rectifying and smoothing an applied signal.

* * * * *